United States Patent
Lin

(10) Patent No.: US 9,693,418 B2
(45) Date of Patent: Jun. 27, 2017

(54) LIGHT EMITTING DIODE DRIVING CHIP HAVING EIGHT OR SIX PINS, DRIVING SYSTEM USING THE LIGHT EMITTING DIODE DRIVING CHIP, AND RELATED METHOD THEREOF

(71) Applicant: Wistron Corporation, New Taipei (TW)

(72) Inventor: Shun-Chang Lin, New Taipei (TW)

(73) Assignee: Wistron Corporation, New Taipei (TW)

(*) Notice: Subject to any disclaimer, the term of this patent is extended or adjusted under 35 U.S.C. 154(b) by 334 days.

(21) Appl. No.: 14/556,246

(22) Filed: Dec. 1, 2014

(65) Prior Publication Data

US 2016/0050732 A1    Feb. 18, 2016

(30) Foreign Application Priority Data

Aug. 13, 2014 (TW) .............................. 103127840 A

(51) Int. Cl.
| | |
|---|---|
| H05B 37/00 | (2006.01) |
| H05B 41/00 | (2006.01) |
| H05B 33/08 | (2006.01) |
| H05B 37/02 | (2006.01) |
| H05B 41/285 | (2006.01) |
| H05B 37/03 | (2006.01) |

(52) U.S. Cl.
CPC ....... *H05B 33/089* (2013.01); *H05B 33/0809* (2013.01); *H05B 33/0812* (2013.01); *H05B 33/0815* (2013.01); *H05B 33/0827* (2013.01); *H05B 33/0851* (2013.01); *H05B 37/02* (2013.01); *H05B 37/03* (2013.01); *H05B 41/2851* (2013.01); *H05B 41/2855* (2013.01); *Y02B 20/341* (2013.01)

(58) Field of Classification Search
CPC .............. H05B 33/089; H05B 33/0815; H05B 33/0827; H05B 33/0809; H05B 33/0851; H05B 37/02; G09G 2330/08
USPC ....... 315/121, 122, 297, 291, 201; 361/93.1, 361/1, 91.1, 78, 79, 86, 87, 93.9
See application file for complete search history.

(56) References Cited

U.S. PATENT DOCUMENTS

2011/0043114 A1* 2/2011 Hsu .................... H05B 33/0815
                                                     315/119
2014/0176014 A1* 6/2014 Hu ....................... G09G 3/3426
                                                     315/307

* cited by examiner

*Primary Examiner* — Alexander H Taningco
*Assistant Examiner* — Christian L Garcia
(74) *Attorney, Agent, or Firm* — Winston Hsu

(57) ABSTRACT

A light emitting diode driving chip includes: a current regulating circuit arranged to selectively outputting four currents to four pins respectively; a current control circuit coupled to the current regulating circuit and a fifth pin, arranged to receive an adjusting signal at the fifth pin to control the four currents; a feedback voltage control circuit arranged to output a feedback voltage to a sixth pin according to a first specific voltage selected from four voltages corresponding to the four pins; and a protection circuit arranged to determine whether a voltage difference between a second specific voltage selected from the four voltages and the first specific voltage is larger than a threshold value. If the first specific voltage is larger than the threshold value, the protection circuit controls the current regulating circuit to stop conducting current to a specific pin corresponding to the first specific voltage.

22 Claims, 6 Drawing Sheets

LIGHT EMITTING DIODE DRIVING CHIP HAVING EIGHT OR SIX PINS, DRIVING SYSTEM USING THE LIGHT EMITTING DIODE DRIVING CHIP, AND RELATED METHOD THEREOF

BACKGROUND OF THE INVENTION

1. Field of the Invention

The present invention relates to a light emitting diode (LED) driving chip, an LED driving system and an associated method, and more particularly, to an LED driving chip having eight pins, an LED driving chip having six pins, an LED driving system and an associated method.

2. Description of the Prior Art

Regarding the existing LED driving chip, it requires an alternating current to direct current (AC/DC) power circuit and a direct current to direct current (DC/DC) power circuit to operate normally. However, the overall power efficiency of such a two-stage power circuit is not high enough due to the fact that the power efficiency of the AC/DC power circuit is different from that of the DC/DC power circuit. When the AC/DC power circuit and the DC/DC power circuit are both used, the overall power efficiency equals the product of the power efficiency of the AC/DC power circuit and the power efficiency of the DC/DC power circuit, thus resulting in power efficiency degradation of an LED driving system.

Further, when a conventional LED driving chip is designed to drive four LED strings, the conventional LED driving chip has at least 16 pins; and when the conventional LED driving chip is designed to drive one LED string only, the conventional LED driving chip has at least 8 pins. Hence, another issue encountered by the conventional LED driving chip is high packaging cost. Moreover, a larger pin count makes an LED driving chip occupy a larger area. Hence, how to integrate pins of an LED driving chip so as to reduce the pin count of the LED driving chip and raise the power efficiency thereof has become an important issue to be solved.

SUMMARY OF THE INVENTION

Therefore, an objective of the present invention is to provide an LED driving chip having eight pins, an LED driving chip having six pins, an LED driving system and an associated method.

According to a first embodiment of the present invention, an LED driving chip having eight pins is provided. The LED driving chip includes a current regulating circuit, a current control circuit, a feedback voltage control circuit and a protection circuit. The current regulating circuit is arranged to selectively output a first current, a second current, a third current and a fourth current to a first pin, a second pin, a third pin and a fourth pin of the LED driving chip, respectively. The current control circuit is coupled to the current regulating circuit and a fifth pin, the current control circuit arranged to receive an adjusting signal from the fifth pin to control the first current, the second current, the third current and the fourth current. The feedback voltage control circuit is arranged to output a feedback voltage to a sixth pin according to a first specific voltage and a setting voltage, wherein the first specific voltage is selected from the first voltage, the second voltage, the third voltage and the fourth voltage corresponding to the first, the second, the third and the fourth pins, respectively. The protection circuit is arranged to determine whether a voltage difference between a second specific voltage and the first specific voltage is larger than a threshold value. The second specific voltage is selected from the first voltage, the second voltage, the third voltage and the fourth voltage. When the voltage difference is larger than the threshold value, the protection circuit controls the current regulating circuit to stop conducting current to a specific pin corresponding to the first specific voltage to make a voltage of the specific pin no longer the first specific voltage, and the feedback voltage control circuit stops utilizing the voltage of the specific pin to output the feedback voltage.

According to a second embodiment of the present invention, an LED driving system is provided. The LED driving system includes an LED driving chip, at least one LED and an adjusting circuit. The LED driving chip has eight pins, and includes a current regulating circuit, a current control circuit, a feedback voltage control circuit, a protection circuit and a power supply. The current regulating circuit is arranged to selectively output a first current, a second current, a third current and a fourth current to a first pin, a second pin, a third pin and a fourth pin of the LED driving chip, respectively. The current control circuit is coupled to the current regulating circuit and a fifth pin, the current control circuit arranged to receive an adjusting signal from the fifth pin to control the first current, the second current, the third current and the fourth current. The feedback voltage control circuit is arranged to output a feedback voltage to a sixth pin according to a first specific voltage and a setting voltage, wherein the first specific voltage is selected from the first, the second, the third and the fourth voltages respectively corresponding to the first, the second, the third and the fourth pins. The protection circuit is arranged to determine whether a voltage difference between a second specific voltage and the first specific voltage is larger than a threshold value, wherein the second specific voltage is selected from the first, the second, the third and the fourth voltages, and when the voltage difference is larger than the threshold value, the protection circuit controls the current regulating circuit to stop conducting current to a specific pin corresponding to the first specific voltage to make a voltage of the specific pin no longer the first specific voltage, and the feedback voltage control circuit stops utilizing the voltage of the specific pin to output the feedback voltage. The power supply has a feedback control end coupled to the sixth pin, and the power supply is arranged to generate a direct current (DC) power voltage at an output end according to the feedback voltage. The at least one LED is coupled between the DC power voltage and at least one pin selected from the first pin, the second pin, the third pin and the fourth pin. The adjusting circuit is coupled to the fifth pin, and the adjusting circuit is arranged to generate the adjusting signal according to a brightness control signal.

According to a third embodiment of the present invention, a driving method applied to an LED driving chip having eight pins is provided. The driving method includes: selectively outputting a first current, a second current, a third current and a fourth current to a first pin, a second pin, a third pin and a fourth pin, respectively; receiving an adjusting signal from a fifth pin to control the first current, the second current, the third current and the fourth current; outputting a feedback voltage to a sixth pin according to a first specific voltage and a setting voltage, wherein the first specific voltage is selected from a first voltage, a second voltage, a third voltage and a fourth voltage respectively corresponding to the first pin, the second pin, the third pin and the fourth pin; determining whether a voltage difference between a second specific voltage and the first specific voltage is larger than a threshold value, wherein the second specific voltage is selected from the first voltage, the second voltage, the third voltage and the fourth voltage; and when the voltage difference is larger than the threshold value, stopping conducting current to a specific pin corresponding to the first specific voltage to make a voltage of the specific pin no longer the first specific voltage, and stopping utilizing the voltage of the specific pin to output the feedback voltage.

According to a fourth embodiment of the present invention, an LED driving chip having six pins is provided. The light emitting diode (LED) driving chip includes a current regulating circuit, a current control circuit, a feedback voltage control circuit and a protection circuit. The current regulating circuit is arranged to selectively output a first current and a second current to a first pin and a second pin, respectively. The current control circuit is coupled to the current regulating circuit and a third pin, the current control circuit arranged to receive an adjusting signal from the third pin to control the first current and the second current. The feedback voltage control circuit is arranged to output a feedback voltage to a fourth pin according to a first specific voltage and a setting voltage, wherein the first specific voltage is selected from a first voltage and a second voltage respectively corresponding to the first pin and the second pin. The protection circuit is arranged to determine whether a voltage difference between a second specific voltage and the first specific voltage is larger than a threshold value, wherein the second specific voltage is selected from the first voltage and the second voltage, and when the voltage difference is larger than the threshold value, the protection circuit controls the current regulating circuit to stop conducting current to a specific pin corresponding to the first specific voltage, so as to make a voltage of the specific pin no longer the first specific voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
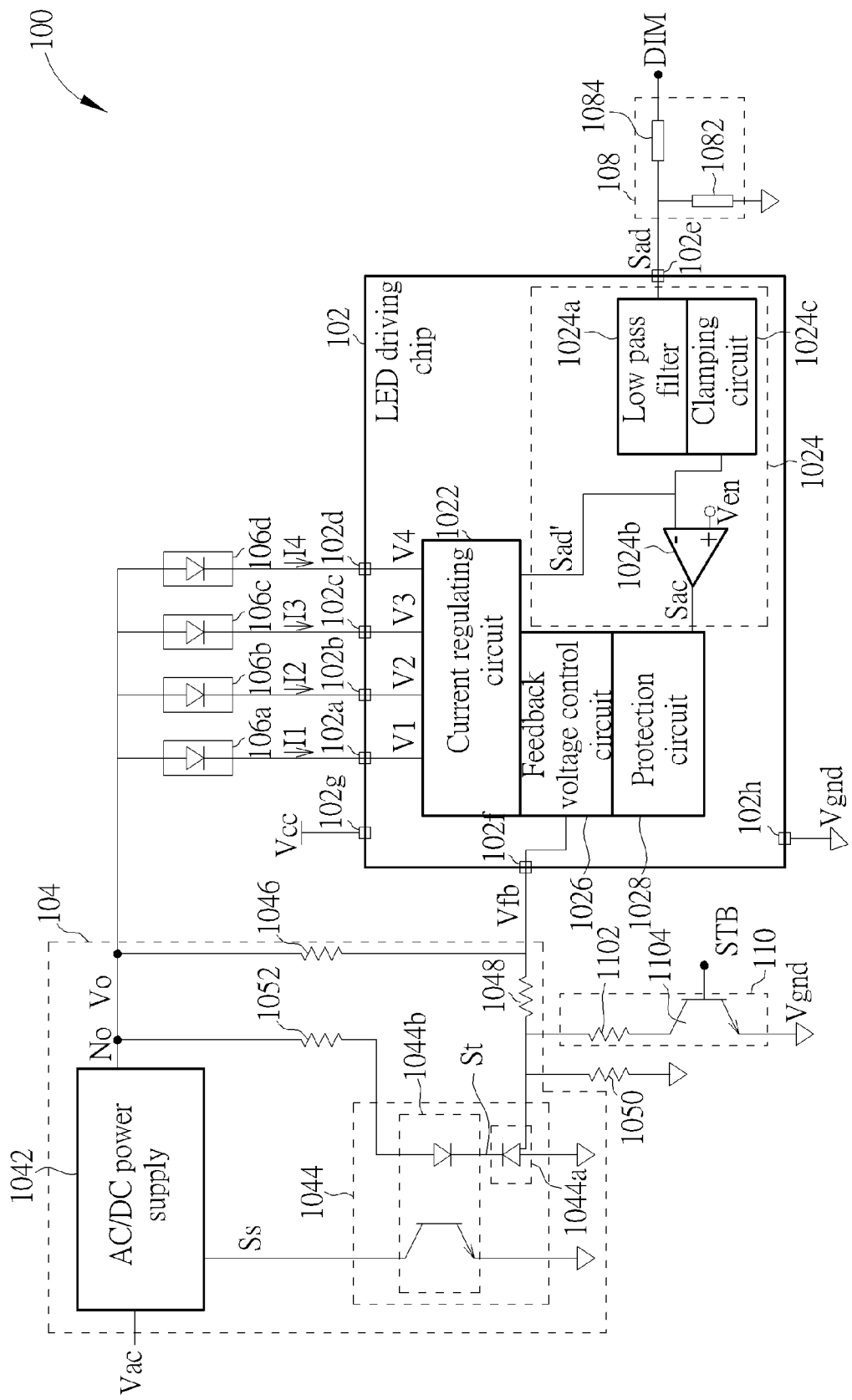
FIG. 1 is a diagram illustrating an LED driving system according to an embodiment of the present invention.

Please refer to FIG. 1, which is a diagram illustrating a light emitting diode (LED) driving system 100 according to an embodiment of the present invention. The LED driving system 100 includes an LED driving chip 102, a power supply 104, four LED strings 106a-106d, an adjusting circuit 108 and a standby protection circuit 110. The LED driving chip 102 has eight pins 102a-102h. For brevity, FIG. 1 does not depict a packaging circuit which has the LED driving chip 102 packed therein. However, one skilled in the art should readily appreciate that this packaging circuit is a packaging circuit having 8 pins. Further, each LED string therein may include at least one LED or a plurality of LEDs connected in series.

In this embodiment, the power supply 104 includes a feedback control end coupled to a sixth pin 102f, and is used for generating an appropriate direct current (DC) power voltage Vo at an output end No according to a first feedback voltage Vfb. The first LED string 106a is coupled between the output end No and the first pin 102a, the second LED string 106b is coupled between the output end No and the second pin 102b, the third LED string 106c is coupled between the output end No and the third pin 102c, and the fourth LED string 106d is coupled between the output end No and fourth pin 102d. The adjusting circuit 108 is coupled to the fifth pin 102e, and used for generating an adjusting signal Sad according to a brightness control signal DIM. The standby protection circuit 110 is coupled to the output end No, and used for reducing the DC power voltage Vo at the output end No according to a standby control signal STB.

The power supply 104 includes an alternating current to direct current (AC/DC) power supply 1042, a sensing circuit 1044, a first resistor 1046, a second resistor 1048 and a third resistor 1050. The AC/DC power supply 1042 is used to convert an alternating current (AC) power voltage Vac into the DC power voltage Vo. The sensing circuit 1044 is coupled between the sixth pin 102f and the AC/DC power supply 1042, and used for generating the sensing signal Ss according to the feedback voltage Vfb. The sensing circuit 1044 includes a regulator 1044a and a photoelectric coupler 1044b. The regulator 1044a is used to generate a regulated voltage signal ST according to the feedback voltage Vfb. The photoelectric coupler 1044b is used to generate the sensing signal Ss according to the regulated voltage signal ST. The first resistor 1046 includes a first end coupled to the output end No, and a second end coupled to the sixth pin 102f. The second resistor 1048 includes a first end coupled to the sixth pin 102f, and a second end coupled to the regulator 1044a. The third resistor 1050 includes a first end coupled to the regulator 1044a, and a second end coupled to a ground voltage Vgnd. The power supply 104 further includes a resistor 1052, which has a first end coupled to the output end No and a second end coupled to the photoelectric coupler 1044b, as shown in FIG. 1. Please note that, the first end of the resistor 1052 is not necessarily coupled to the output end No. For example, the first end of the resistor 1052 may be coupled to the supply voltage Vcc at the seventh pin 102g instead. Similarly, the first end of the resistor 1046 is not necessarily coupled to the output end No. For example, the first end of the resistor 1046 may be coupled to the supply voltage Vcc at the seventh pin 102g instead.

The standby protection circuit 110 includes a fourth resistor 1102 and a transistor switch 1104. The transistor switch 1104 may be implemented using a bipolar junction transistor (BJT). The fourth resistor 1102 includes a first end coupled to the second end of the second resistor 1048. In other words, the transistor switch 1104 includes a first connecting end coupled to a second end of the fourth resistor 1102, a second connecting end coupled to the ground voltage Vgnd, and a control end arranged for receiving the standby control signal STB. In this embodiment, when the LED driving system 100 is in a standby mode, the standby control signal STB turns off the transistor switch 1104 in order to reduce the DC power voltage Vo at the output end No.

The adjusting circuit 108 includes a first passive element 1082 and a second passive element 1084. The first passive element 1082 includes a first end coupled to the fifth pin 102e, and a second end coupled to the ground voltage Vgnd. The second passive element 1084 includes a first end coupled to the fifth pin 102e, and a second end arranged for receiving the brightness control signal DIM. The first passive element 1082 may be a combination of a resistor, a capacitor, and/or an inductor, and the second passive element 1084 may also be a combination of a resistor, a capacitor, and/or an inductor. In this embodiment, the brightness control signal DIM may be an initialization signal, a fixed DC voltage, an adjustable DC voltage or a pulse width modulation (PWM) signal. The adjusting circuit 108 is used to adjust the brightness control signal DIM as a DC voltage or a voltage signal (i.e., the adjusting signal Sad) substantially equal to a DC signal.

The LED driving chip 102 includes a current regulating circuit 1022, a current control circuit 1024, a feedback voltage control circuit 1026 and a protection circuit 1028. The current regulating circuit 1022 is used to selectively output a first current I1, a second current I2, a third current I3 and a fourth current I4 to the first pin 102a, the second pin 102b, the third pin 102c and the fourth pin 102d, respectively. The current control circuit 102e is coupled to the current regulating circuit 1022 and the fifth pin 102e, and used for receiving the adjusting signal Sad from the fifth pin 102e so as to control the first current I1, the second current I2, the third current I3 and the fourth current I4. The feedback voltage control circuit 1026 is used to output the feedback voltage Vfb to the sixth pin 102f according to a first specific voltage selected from a first voltage V1, a second voltage V2, a third voltage V3 and a fourth voltage V4 (which correspond to the first pin 102a, the second pin 102b, the third pin 102c and the fourth pin 102d, respectively) and a setting voltage Vref. The protection circuit 1028 is used to determine whether a voltage difference between a second specific voltage Vmax selected from the first voltage V1, the second voltage V2, the third voltage V3 and the fourth voltage V4 and the first specific voltage is larger than a threshold value Vroom_set. If the voltage difference is larger than the threshold value Vroom_set, the protection circuit 1028 controls the current regulating circuit 1022 to stop conducting current to a specific pin corresponding to the first specific voltage.

Further, a seventh pin 102g of the LED driving chip 102 is coupled to a supply voltage Vcc, and an eighth pin 102h of the LED driving chip 102 is coupled to the ground voltage Vgnd.

According to an embodiment of the present invention, the first voltage V1, the second voltage V2, the third voltage V3 and the fourth voltage V4 may be viewed as the voltages at the first pin 102a, the second pin 102b, the third pin 102c and the fourth pin 102a, respectively. The first specific voltage is the lowest voltage among from the first voltage V1, the second voltage V2, the third voltage V3 and the fourth voltage V4, and the second specific voltage Vmax is the highest voltage among the first voltage V1, the second voltage V2, the third voltage V3 and the fourth voltage V4.

The current control circuit 1024 includes a low pass filter 1024a, a comparator 1024b and a clamping circuit 1024c. The low pass filter 1024a is used for low pass filtering the adjusting signal Sad to generate a filtered adjusting signal Sad', so as to control the first current I1, the second current I2, the third current I3 and the fourth current I4. The filtered adjusting signal Sad' is proportional to the adjusting signal Sad; however, the filtered adjusting signal Sad' is smoother and more stable than the adjusting signal Sad. The comparator 1024b is used to compare the filtered adjusting signal Sad' with a predetermined voltage Ven, in order to generate an initialization signal Sac to enable the LED driving chip 102. Specifically, if the filtered adjusting signal Sad' is smaller than the predetermined voltage Ven, the comparator 1024b outputs the initialization signal Sac to disable the LED driving chip 102, so as to maintain low static working current to reduce power consumption of the chip. That is, the first current I1, the second current I2, the third current I3 and the fourth current I4 are set to zero current values, and the feedback voltage control circuit 1026 will not output the feedback voltage Vfb. If the filtered adjusting signal Sad' is larger than predetermined voltage Ven, the comparator 1024b outputs the initialization signal Sac to enable the LED driving chip 102 so as to make the current regulating circuit 1022, the feedback voltage control circuit 1026 and the current control circuit 1024 operate normally. However, when the filtered adjusting signal Sad' is raised over an upper-bound voltage, the clamping circuit 1024c may be used to clamp the filtered adjusting signal Sad' at the upper-bound voltage, so as to stop raising the filtered adjusting signal Sad'. In other words, when the filtered adjusting signal Sad' is raised over the upper-bound voltage, the clamping circuit 1024c is used to keep the filtered adjusting signal Sad' at the upper-bound voltage, so as to protect the LED driving chip 102 and the LED strings 106a-106d. Hence, the current control circuit 1024 of the present invention may adjust the first current I1, the second current I2, the third current I3 and the fourth current I4 through the brightness control signal DIM, so as to reach the goal of controlling the brightness of the four LED strings 106a-106d. Please note that, since the brightness control signal DIM may be an initialization signal, a fixed DC voltage, an adjustable DC voltage or a PWM signal, the adjusting signal Sad may be an adjusted version of an initialization signal, a fixed DC voltage, an adjustable DC voltage or a PWM signal.

Figure 2:
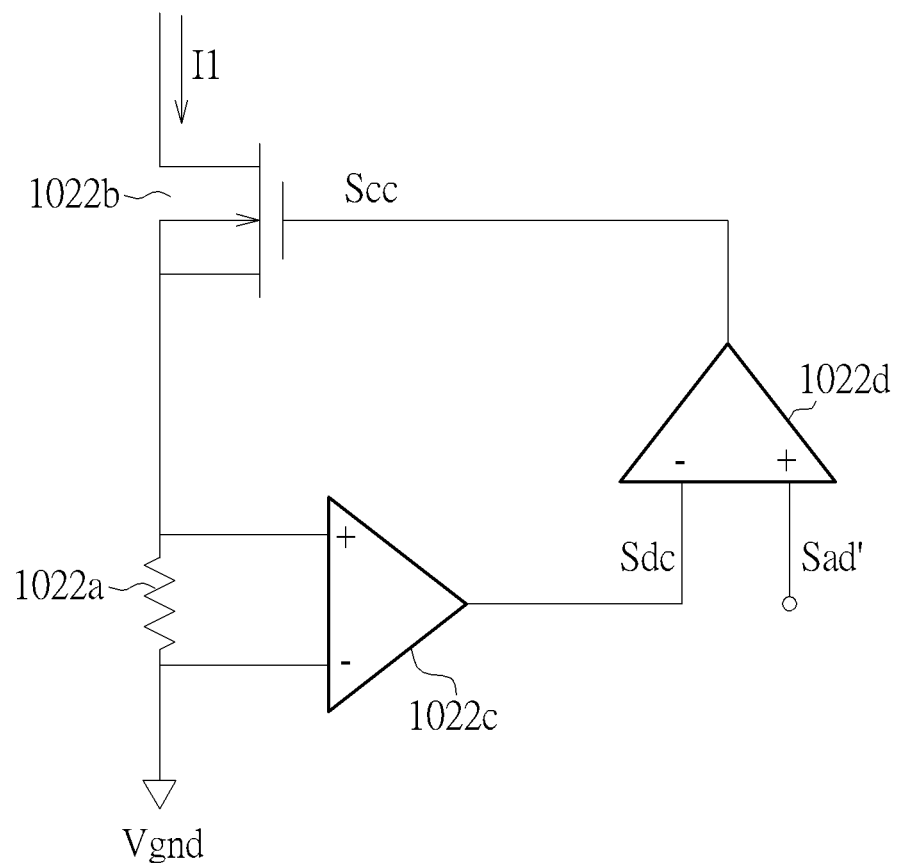
FIG. 2 a diagram illustrating a current regulating circuit arranged for conducting a first current according to an embodiment of the present invention.

Please refer to FIG. 2, which is a diagram illustrating a current regulating circuit 1022 arranged for conducting a first current I1 according to an embodiment of the present invention. Please note that, each of the circuits used for conducting the second current I2, the third current I3 and the fourth current I4 is similar to the circuit used for conducting the first current I1 shown in FIG. 2, and thus will not be further described.

The current regulating circuit 1022 arranged for conducting the first current I1 includes a resistor 1022a, a transistor 1022b, a first differential amplifier 1022c and a second differential amplifier 1022d. The resistor 1022a includes a first end coupled to the ground voltage Vgnd. The transistor 1022b includes a first connecting end coupled to a second end of the resistor 1022a, a second connecting end arranged for conducting the first current I1, and a control end arranged for receiving a control signal Scc. The first differential amplifier 1022c is used to generate the detection voltage Sdc according to the voltage across the first end and the second end of the resistor 1022a. The second differential amplifier 1022d is used to generate the control signal Scc according to the detection voltage Sdc and the filtered adjusting signal Sad', so as to control the transistor 1022b. In other words, the first differential amplifier 1022c is used to detect the voltage difference caused by the first current I1 flowing through the resistor 1022a to generate the detection voltage Sdc, so as to determine the magnitude of the first current I1. The second differential amplifier 1022d is used to amplify the voltage difference between the detection voltage Sdc and the filtered adjusting signal Sad', so as to control the transistor 1022b. Hence, through adjusting the resistance value of the resistor 1022a and the gain values of the first differential amplifier 1022c and the second differential amplifier 1022d, the circuit of this embodiment may effectively control the magnitude of the first current I1. Since the methods for controlling the second current I2, the third current I3 and the fourth current I4 are similar to the method for controlling the first current I1 mentioned above, the detailed operations for controlling the second current I2, the third current I3 and the fourth current I4 will not be further described.

Figure 3:
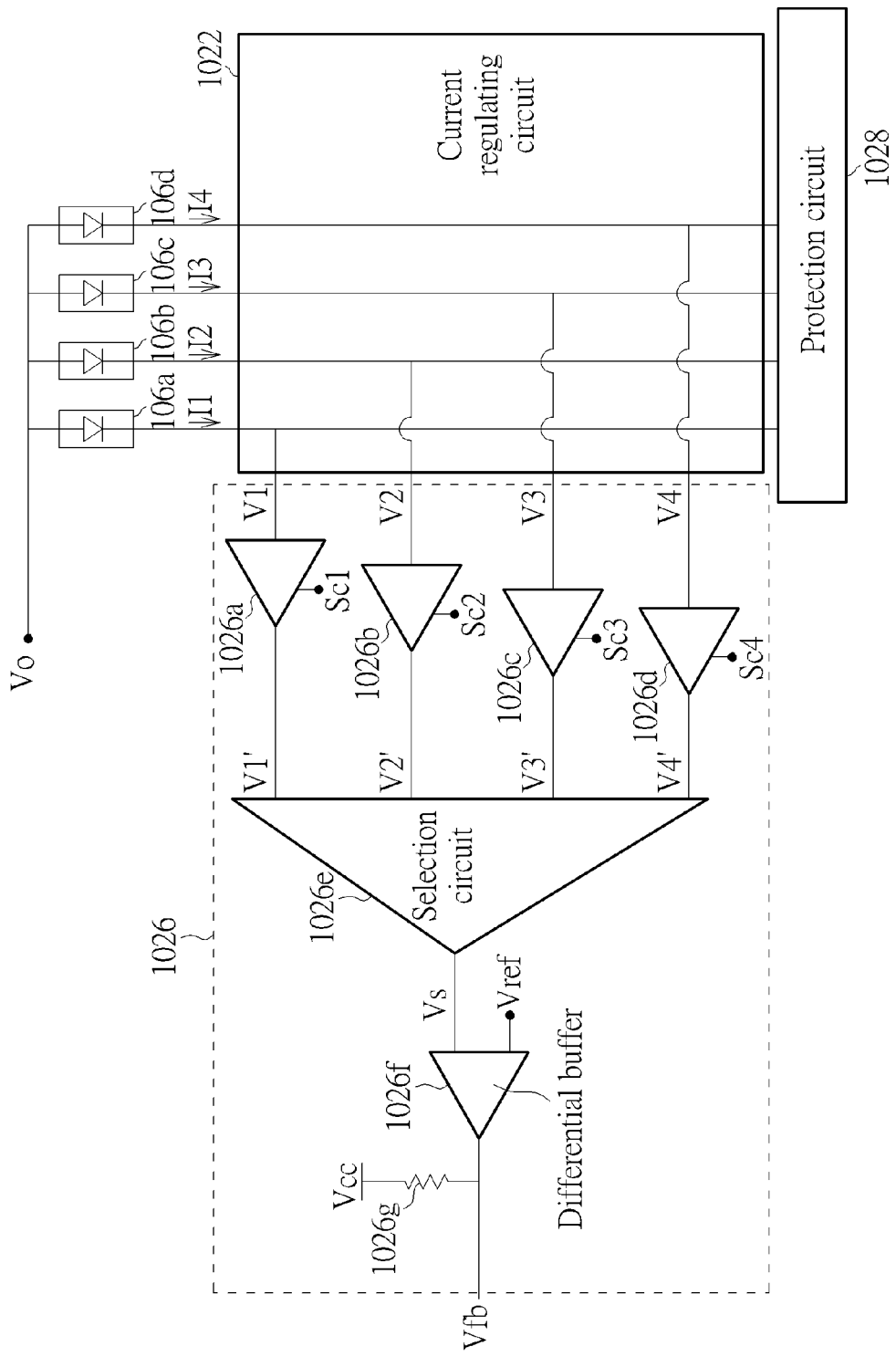
FIG. 3 is a diagram illustrating a feedback voltage control circuit according to an embodiment of the present invention.

Please refer to FIG. 3, which is a diagram illustrating a feedback voltage control circuit 1026 according to an embodiment of the present invention. For better understanding of the operating characteristics of the feedback voltage control circuit 1026, FIG. 3 depicts the LED strings 106a-106d, the current regulating circuit 1022 and the protection circuit 1028. The feedback voltage control circuit 1026 includes a first buffer 1026a, a second buffer 1026b, a third buffer 1026c, a fourth buffer 1026d, a selection circuit 1026e and a differential buffer 1026f. The first buffer 1026a is used to selectively output the first voltage V1 as a first buffered voltage V1' according to a first control signal Sc1. The second buffer 1026b is used to selectively output the second voltage V2 as a second buffered voltage V2' according to a second control signal Sc2. The third buffer 1026c is used to selectively output the third voltage V3 as a third buffered voltage V3' according to a third control signal Sc3. The fourth buffer 1026d is used to selectively output the fourth voltage V4 as a fourth buffered voltage V4' according to a fourth control signal Sc4. The selection circuit 1026e is used to output a lowest voltage selected from the first buffered voltage V1', the second buffered voltage V2', the third buffered voltage V3' and the fourth buffered voltage V4' as a selection voltage Vs. The differential buffer 1026f is used to generate the feedback voltage Vfb according to the difference between the setting voltage Vref and the selection voltage Vs. Further, in order to ensure that the AC/DC power supply 1042 in the power supply 104 can operate safely, this embodiment provides two methods as follows. The first method directly controls the differential buffer 1026f to provide a high impedance to the output end of the LED driving chip 102 (i.e., the sixth pin 102f) before the LED driving chip 102 starts operating, so as to make the feedback voltage Vfb have a higher voltage. The second method utilizes an output pull-up resistor 1026g to make the feedback voltage Vfb at the sixth pin 102f have a higher voltage before the LED driving chip 102 starts operating, as shown in FIG. 3. The output pull-up resistor 1026g is coupled between the output end of the differential buffer 1026f (i.e., the sixth pin 102f) and the supply voltage Vcc. To sum up, before the LED driving chip 102 starts operating, the differential buffer 1026f provides high input impedance to the sixth pin 102f. After the LED driving chip 102 operates, the differential buffer 1026f provides low input impedance to the sixth pin 102f. In this way, the AC/DC power supply 1042 in the power supply 104 may operate safely. Hence, before the LED driving chip 102 starts operating, the sixth pin 102f is high input impedance, thus making the feedback voltage Vfb at the sixth pin 102f have a higher voltage. This higher voltage stops the AC/DC power supply 1042 from raising the DC power voltage Vo. After the LED driving chip 102 operates, the sixth pin 102f is low input impedance, thus making the feedback voltage Vfb at the sixth pin 102f have a lower voltage. This lower voltage makes the AC/DC power supply 1042 begin to raise the DC power voltage Vo.

Figure 4:
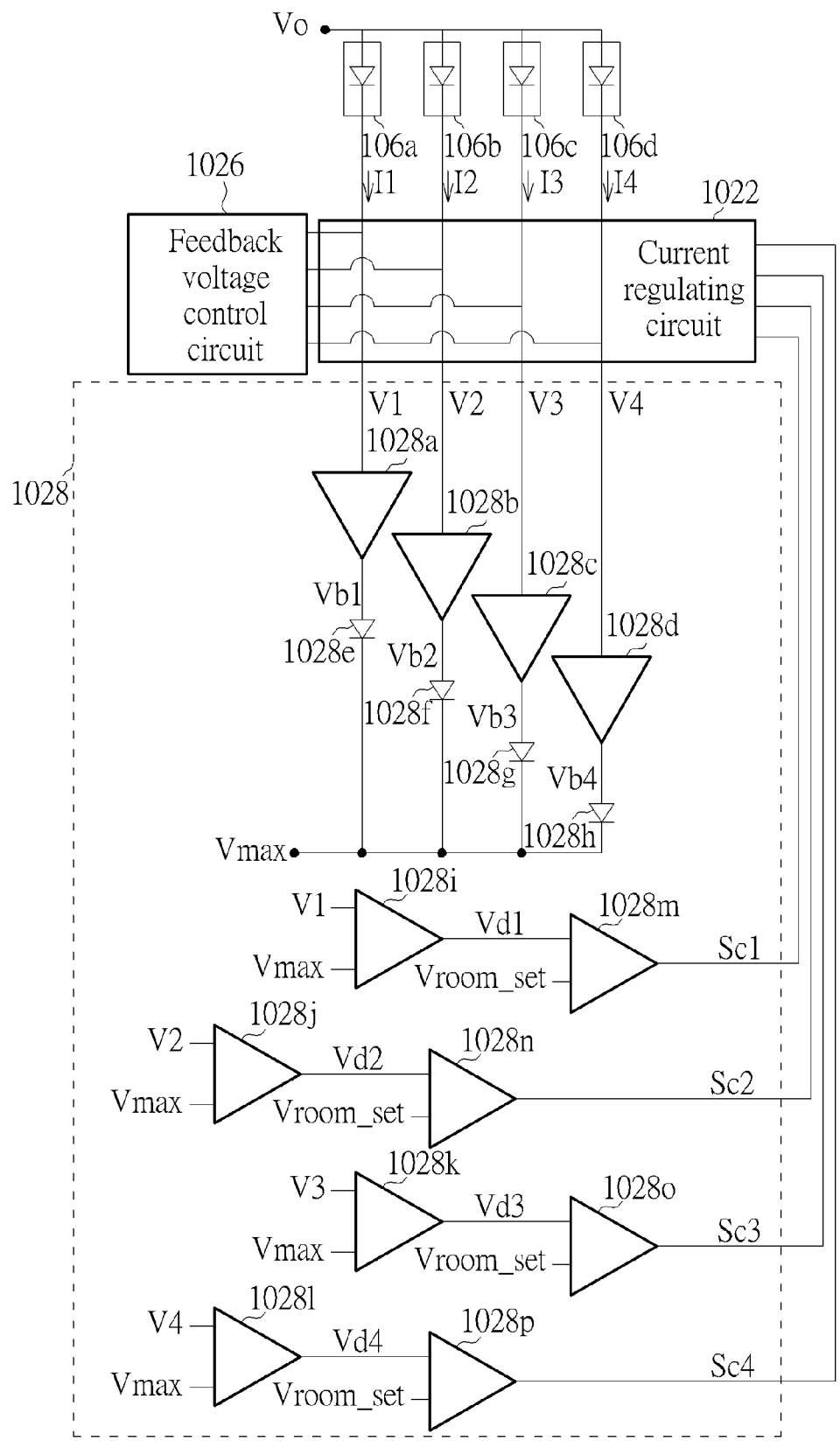
FIG. 4 is a diagram illustrating a protection circuit according to an embodiment of the present invention.

Please refer to FIG. 4, which is a diagram illustrating a protection circuit 1028 according to an embodiment of the present invention. For better understanding of the operating characteristics of the protection circuit 1028, FIG. 4 depicts the LED strings 106a-106d, the current regulating circuit 1022 and the feedback voltage control circuit 1026. The protection circuit 1028 includes a first buffer 1028a, a second buffer 1028b, a third buffer 1028c, a fourth buffer 1028d, a first diode 1028e, a second diode 1028f, a third diode 1028g, a fourth diode 1028h, a first differential amplifier 1028i, a second differential amplifier 1028j, a third differential amplifier 1028k, a fourth differential amplifier 1028l, a first comparator 1028m, a second comparator 1028n, a third comparator 1028o and a fourth comparator 1028p. The first buffer 1028a is used to buffer the first voltage V1, so as to generate a first buffered voltage Vb1. The second buffer 1028b is used to buffer the second voltage V2, so as to generate a second buffered voltage Vb2. The third buffer 1028c is used to buffer the third voltage V3, so as to generate a third buffered voltage Vb3. The fourth buffer 1028d is used to buffer the fourth voltage V4, so as to generate a fourth buffered voltage Vb4. The first diode 1028e includes an anode and a cathode, wherein the anode of the first diode 1028e is used to receive the first buffered voltage Vb1. The second diode 1028f includes an anode and a cathode, wherein the anode of the second diode 1028f is used to receive the second buffered voltage Vb2. The third diode 1028g includes an anode and a cathode, wherein the anode of the third diode 1028g is used to receive the third buffered voltage Vb3. The fourth diode 1028h includes an anode and a cathode, wherein the anode of the fourth diode 1028h is used to receive the fourth buffered voltage Vb4. The cathodes of the first diode 1028e, the second diode 1028f, the third diode 1028g and the fourth diode 1028h are all coupled to a common end Nc, which is used to output a second specific voltage Vmax.

Further, the first differential amplifier 1028i is used to generate a first voltage difference Vd1 between the second specific voltage Vmax and the first voltage V1. The second differential amplifier 1028j is used to generate a second voltage difference Vd2 between the second specific voltage Vmax and the second voltage V2. The third differential amplifier 1028k is used to generate a third voltage difference Vd3 between the second specific voltage Vmax and the third voltage V3. The fourth differential amplifier 1028l is used to generate a fourth voltage difference Vd4 between the second specific voltage Vmax and the fourth voltage V4. The first comparator 1028m is used to compare the first voltage difference Vd1 with a threshold value Vroom_set. If the first voltage difference Vd1 is larger than the threshold value Vroom_set, the first comparator 1028m controls the current regulating circuit 1022 to stop conducting the first current I1 to the first pin 102a Meanwhile, the first comparator 1028m also disables the first buffer 1026a and pulls up the first buffered voltage V1' to the supply voltage Vcc, so as to stop the first voltage V1 from being provided to the selection circuit 1026e. The second comparator 1028n is used to compare the second voltage difference Vd2 with the threshold value Vroom_set. If the second voltage difference Vd2 is larger than the threshold value Vroom_set, the second comparator 1028n controls the current regulating circuit 1022 to stop conducting the second current I2 to the second pin 102b. Meanwhile, the second comparator 1028n disables the second buffer 1026b and pulls up the second buffered voltage V2' to the supply voltage Vcc, so as to stop the second voltage V2 from being provided to the selection circuit 1026e. The third comparator 1028o is used to compare the third voltage difference Vd3 with the threshold value Vroom_set. If the third voltage difference Vd3 is larger than the threshold value Vroom_set, the third comparator 1028o controls the current regulating circuit 1022 to stop conducting the third current I3 to the third pin 102c. Meanwhile, the third comparator 1028o disables the third buffer 1026c and pulls up the third buffered voltage V3' to the supply voltage Vcc, so as to stop the third voltage V3 from being provided to the selection circuit 1026e. The fourth comparator 1028p is used to compare the fourth voltage difference Vd4 with the threshold value Vroom_set. If the fourth voltage difference Vd4 is larger than the threshold value Vroom_set, the fourth comparator 1028p controls the current regulating circuit 1022 to stop conducting the fourth current I4 to the fourth pin 102d. Meanwhile, the fourth comparator 1028p disables the fourth buffer 1026d and pulls up the fourth buffered voltage V4' to the supply voltage Vcc, so as to stop the fourth voltage V4 from being provided to the selection circuit 1026e.

Please note that, the LED driving chip 102 provided by the present invention is capable of detecting the voltages at the pins connected to the LED strings 102a-102d. When the voltage at a pin is abnormal, the LED driving chip 102 will automatically stop outputting current to this abnormal pin, so as to disable the LED string corresponding to this abnormal pin.

Specifically, please refer to FIG. 1-4 at the same time. When the four LED strings 106a-106d are respectively coupled between the pins 102a-102d and the output end No, the LED driving chip 102 may control the power supply 104 to output the DC power voltage Vo, so as to enable the LED strings 106a-106d. Please note that, since each LED has substantially the same voltage drop, the voltage at the pin is equal to the DC power voltage Vo minus the voltage drop of the entire LED string consisted of the LEDs. In general, each LED string includes the same number of LEDs. Hence, in a general situation, the voltages V1-V4 at the pins 102a-102d are substantially the same. In the present invention, the feedback voltage control circuit 1026 selects the lowest voltage (i.e., the first specific voltage) from the voltages V1-V4 to generate a feedback voltage Vfb to the power supply 104. When the power supply 104 receives the feedback voltage Vfb, the power supply 104 gradually pulls up the DC power voltage Vo to enable the LED strings 106a-106d. When the DC power voltage Vo reaches a reasonable level capable of enabling all of the LED strings 106a-106d, the power supply 104 stops pulling up the DC power voltage Vo, and keeps the DC power voltage Vo at a substantially fixed voltage.

Then, a user may adjust the currents I1-I4 flowing through the LED strings 106a-106d with the brightness control signal DIM, in order to adjust the brightness of the LED strings 106a-106d. In the present invention, the fifth pin 102e is designed for receiving three different types of signals to adjust the brightness of the LED strings 106a-106d. Specifically, a user may use a fixed DC voltage, an adjustable DC voltage or a PWM signal to control the currents I1-I4 flowing through the LED strings 106a-106d. Since the present invention can receive different types of brightness adjusting signals by using only one pin (i.e., the fifth pin 102e), another advantage provided by the present invention is reducing the pin count of the LED driving chip 102.

Please note that, when the LED driving chip 102 operates normally, the protection circuit 1028 may detect whether the voltages V1-V4 are abnormal. As can be seen from FIG. 4, the protection circuit 1028 is used to determine whether a voltage difference between a highest voltage (i.e., the second specific voltage Vmax) selected from the voltages V1-V4 and a lowest voltage selected from the voltages V1-V4 is larger than the threshold value Vroom_set. If the voltage difference is larger than threshold value Vroom_set, an operation of conducting current to the pin having the lowest voltage will be stopped. Meanwhile, the protection circuit 1028 outputs a control signal to the buffer corresponding to the pin having the lowest voltage, so as to pull up the voltage at the pin to the supply voltage Vcc.

For example, if the first LED string 106a among the LED strings 106a-106d is open-circuited or the pin 102a is short-circuited to the ground voltage Vgnd, the first voltage V1 at the pin 102a will be equal or approximate to 0V. At this time, the feedback voltage control circuit 1026 selects the first voltage V1 of the pin 102a as the first specific voltage, and generates the feedback voltage Vfb to the power supply 104. Since the first voltage V1 is extremely low (i.e., 0V), the AC/DC power supply 1042 will gradually pull up the DC power voltage Vo, in order to raise the first voltage V1. In this way, the voltages V2-V4 of other pins 102b-102d will also be raised gradually. However, the first voltage V1 remains 0V. In other words, the highest voltage (i.e., the second specific voltage Vmax) detected by the protection circuit 1028 is getting higher, while the lowest voltage (i.e., the first voltage V1) remains 0V. Hence, the first voltage difference Vd1 generated by using the first comparator 1028i of the protection circuit 1028 to compare the second specific voltage Vmax with the first voltage V1 is getting larger. When the first voltage difference Vd1 is larger than the threshold value Vroom_set, the protection circuit 1028 judges that the first LED string 106a is abnormal. Hence, the fifth comparator 1028m will output the first control signal Sc1 to control the current regulating circuit 1022 to stop conducting the first current I1 to the first pin 102a. Meanwhile, the first control signal Sc1 is used to disable or disconnect the first buffer 1026a, so as to pull up the first voltage V1 at the first pin 102a to the supply voltage Vcc. In this way, the first voltage V1 will no longer be the lowest voltage, and the feedback voltage control circuit 1026 will select a lowest voltage from other voltages V2-V4 as the first specific voltage, and generates the feedback voltage Vfb to the power supply 104. Next, after the negative feedback between the power supply 104 and the LED driving chip 102 operates, the LED strings 106b-106d can operate normally.

Further, in another example, if a short circuit situation occurs in one or multiple LEDs of the first LED string 106a, the first voltage V1 at the pin 102a will be raised, thus making the first voltage V1 higher than the voltages V2-V4. In this situation, the first voltage V1 will become the highest voltage (i.e., the second specific voltage Vmax). If the second differential amplifier 1028j and the second comparator 1028n in the protection circuit 1028 determine that the second voltage difference Vd2 between the second specific voltage Vmax and the second voltage V2 is larger than the threshold value Vroom_set, the second comparator 1028n outputs the second control signal Sc2 to control the current regulating circuit 1022 to stop conducting the second current I2 to the second pin 102b. Meanwhile, the second control signal Sc2 disables or disconnects the second buffer 1026b, so as to pull up the second voltage V2 at the second pin 102b to the supply voltage Vcc. If the third differential amplifier 1028k and the third comparator 1028o in the protection circuit 1028 determine that the third voltage difference Vd3 between the second specific voltage Vmax and the third voltage V3 is larger than the threshold value Vroom_set, the third comparator 1028o outputs the third control signal Sc3 to control the current regulating circuit 1022 to stop conducting the third current I3 to the third pin 102c, and the third control signal Sc3 is utilized to disable or disconnect the third buffer 1026c, so as to pull up the third voltage V3 at the third pin 102c to the supply voltage Vcc. Similarly, if the fourth differential amplifier 1028l and the fourth comparator 1028p in the protection circuit 1028 determines that the fourth voltage difference Vd4 between the second specific voltage Vmax and the fourth voltage V4 is larger than the threshold value Vroom_set, the fourth comparator 1028p outputs the fourth control signal Sc4 to control the current regulating circuit 1022 to stop conducting the fourth current I4 to the fourth pin 102d, and the fourth control signal Sc4 is utilized to disable or disconnect the fourth buffer 1026d, so as to pull up the fourth voltage V4 at the fourth pin 102d to the supply voltage Vcc. Through the above operations, if all of the currents I2-I4 are cut off, there is only the first voltage V1 left for the feedback voltage control circuit 1026 to generate the feedback voltage Vfb to the power supply 104. That is, in this example where an abnormal situation occurs, only the first LED string 106a which is short-circuited remains enabled, so that the user may find that the brightness of the LED driving system 100 reduces obviously. Therefore, the user may know that there is a problem occurring in the connections of the LED strings 106a-106d.

Moreover, it can be seen from FIG. 1 that the LED driving system 100 of the present invention only employs a one-stage power supply (i.e., the AC/DC power supply 1042) to generate the DC power voltage Vo, rather than using a two-stage power supply (e.g., a DC to DC (DC/DC) power supply and an AC/DC power supply). That is, the LED driving system 100 of the present invention does not need to use a DC/DC power supply, and uses an AC/DC power supply only to generate the DC power voltage Vo. Hence, the LED driving system 100 of the present invention may avoid power loss of one stage, thus improving the power efficiency of the system as well as saving the manufacturing cost and area of the system. Please note that, the AC/DC power supply 1042 in the LED driving system 100 may be replaced with a DC/DC power supply.

Further, the LED driving chip 102 of the present invention may provide the circuit protection function through detecting the first voltage V1, the second voltage V2, the third voltage V3 and the fourth voltage V4 at the first pin 102a, the second pin 102b, the third pin 102c and the fourth pin 102d, respectively, instead of using an over voltage protection pin to detect the DC power voltage Vo. Hence, the LED driving chip 102 of the present invention can save one pin needed for providing the over voltage protection.

Further, with the use of the standby protection circuit 110, when the LED driving system 100 is in a standby mode, the standby control signal STB turns off the transistor switch 1104 to reduce the DC power voltage Vo at the output end No. In this way, the AC/DC power supply 1042 will enter the standby mode as well. Hence, the LED driving system 100 of the present invention may save extra power due to entering the standby mode.

Figure 5:
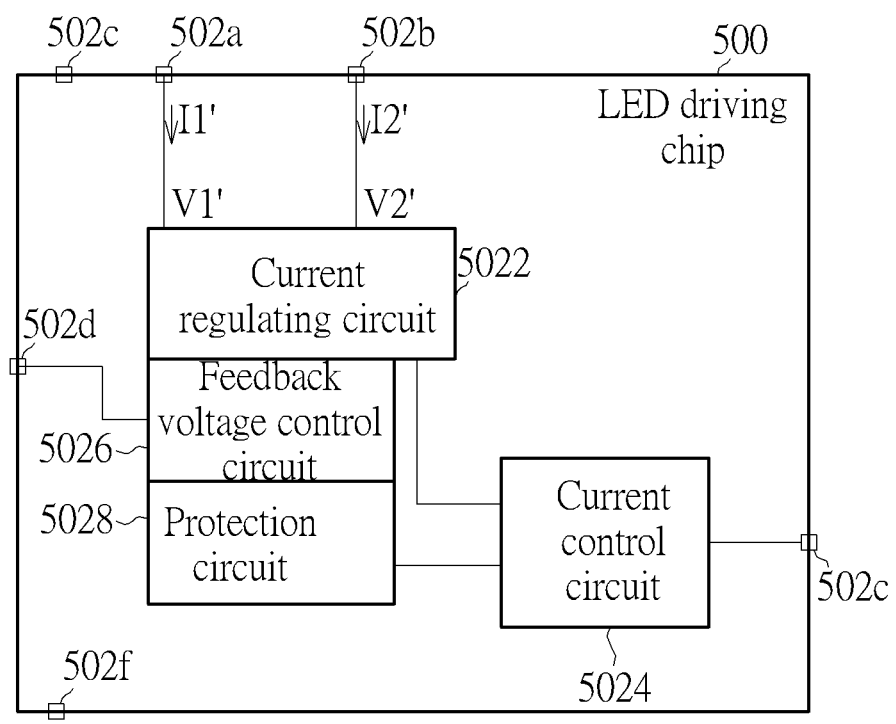
FIG. 5 is a diagram illustrating an LED driving chip having six pins according to an embodiment of the present invention.

Moreover, based on a similar method performed upon the LED driving chip 102, the present invention further provides an LED driving chip 500 having six pins, as shown in FIG. 5. FIG. 5 is a diagram illustrating the LED driving chip 500 having six pins according to an embodiment of the present invention. The LED driving chip 500 includes a current regulating circuit 5022, a current control circuit 5024, a feedback voltage control circuit 5026 and a protection circuit 5028. The current regulating circuit 5022 is used to selectively output a first current I1' and a second current I2' to the first pin 502a and the second pin 502b, respectively. The current control circuit 5024 is coupled to the current regulating circuit 5022 and the third pin 502c, and arranged for receiving the adjusting signal Sad" from the third pin 502c to control the first current I1' and second current I2'. The feedback voltage control circuit 5026 is used to output the feedback voltage Vfb' to the fourth pin 502d according to a first specific voltage (which is selected from a first voltage V1' and a second voltage V2' corresponding to the first pin 502a and the second pin 502b respectively) and a setting voltage. The protection circuit 5028 is used to determine whether a voltage difference between a second specific voltage (which is selected from the first voltage V1' and the second voltage V2') and the first specific voltage is larger than a threshold value. If the voltage difference is larger than the threshold value, the protection circuit 5028 controls the current regulating circuit 5022 to stop conducting current to a specific pin corresponding to the first specific voltage. Further, a fifth pin 102e of the LED driving chip 502 is coupled to a supply voltage, and a sixth pin 102f of the LED driving chip 502 is coupled to the ground voltage.

Please note that, compared with the LED driving chip 102, the LED driving chip 500 has only two output currents (i.e., the first current I1' and the second current I2'). The operations of other elements are similar to those of the elements of the LED driving chip 102. One skilled in the art can readily understand the operation characteristics of the LED driving chip 500 after reading above descriptions regarding the LED driving chip 102. Hence, the detailed operations of the LED driving chip 500 will not be further described.

Figure 6:
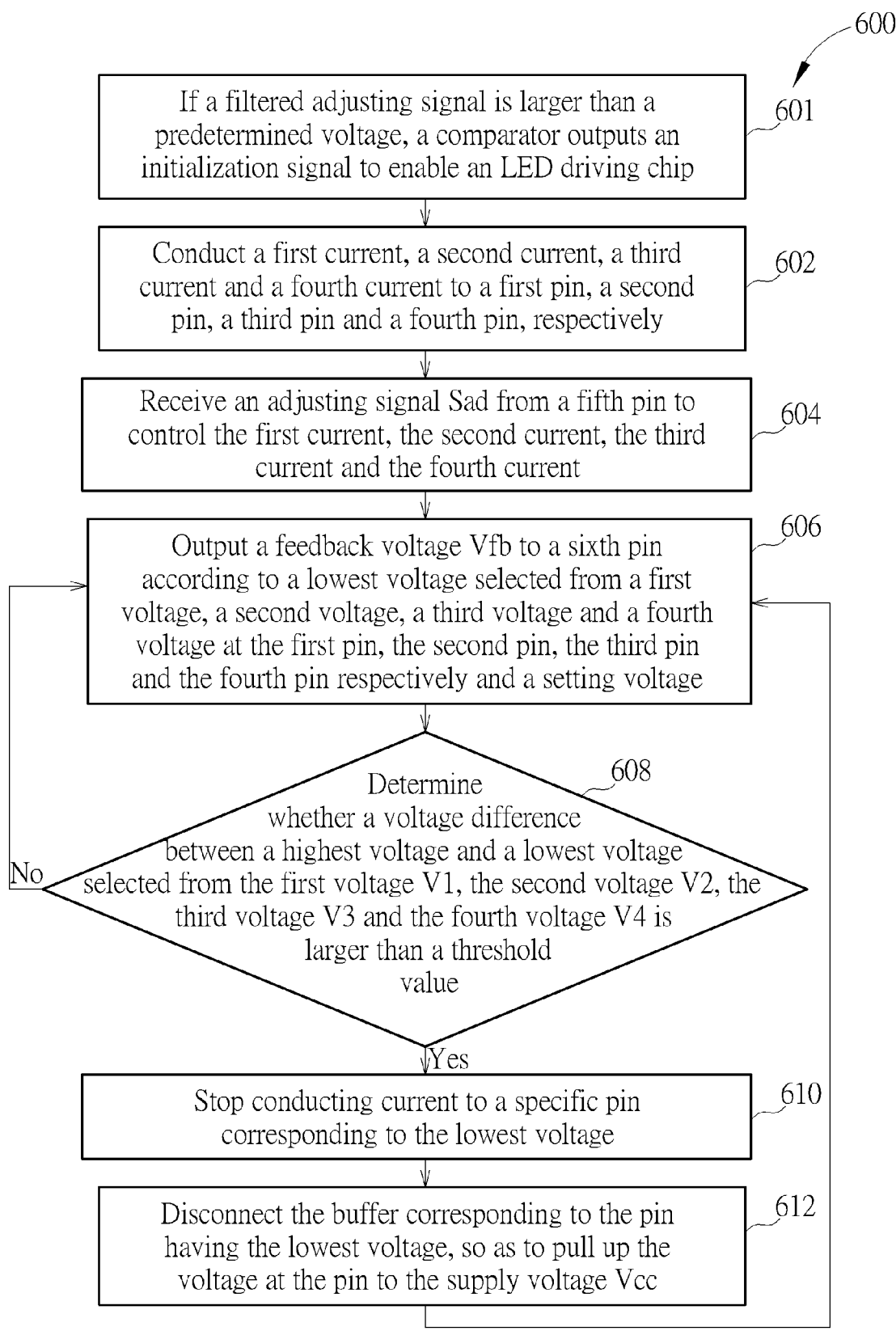
FIG. 6 is a flowchart illustrating a driving method applied to an LED driving chip having eight pins according to an embodiment of the present invention.

In short, the method for operating the LED driving chip 102 of the present invention can be summarized as the steps shown in FIG. 6. FIG. 6 is a flowchart illustrating a driving method 600 applied to an LED driving chip having eight pins according to an embodiment of the present invention. Concerning the following descriptions regarding the driving method 600, please also refer to the LED driving chip 102 shown in FIG. 1. Further, if the result is substantially the same, the steps are not required to be executed in the exact order shown in FIG. 6. That is, other steps may be inserted therein. The driving method 600 includes following steps.

Step 601: If the filtered adjusting signal Sad' is larger than the predetermined voltage Ven, the comparator 1024b outputs the initialization signal Sac to enable the LED driving chip 102.

Step 602: Conduct the first current I1, the second current I2, the third current I3 and the fourth current I4 to the first pin 102a, the second pin 102b, the third pin 102c and the fourth pin 102d, respectively.

Step 604: Receive the adjusting signal Sad from the fifth pin 102e to control the first current I1, the second current I2, the third current I3 and the fourth current I4.

Step 606: Output the feedback voltage Vfb to the sixth pin 102f according to a lowest voltage selected from the first voltage V1, the second voltage V2, the third voltage V3 and the fourth voltage V4 at the first pin 102a, the second pin 102b, the third pin 102c and the fourth pin 102d respectively and a setting voltage Vref.

Step 608: Determine whether a voltage difference between a highest voltage (i.e., the second specific voltage Vmax) and a lowest voltage selected from the first voltage V1, the second voltage V2, the third voltage V3 and the fourth voltage V4 is larger than a threshold value Vroom_set. If yes, go to step 610; otherwise, go to step 606.

Step 610: Stop conducting current to a specific pin corresponding to the lowest voltage.

step 612: Disconnect the buffer corresponding to the pin having the lowest voltage, so as to pull up the voltage at the pin to the supply voltage Vcc. Next, go to step 606.

In view of above, the method provided by the present invention may drive four LED strings with the LED driving chip 102 having eight pins only, or drive two LED strings with the LED driving chip 500 having six pins only. Further, the LED driving system 100 of the present invention only requires a one-stage power supply (i.e., the AC/DC power supply 1042) to provide the DC power voltage Vo to the four LED strings or the two LED strings. Therefore, the LED driving system 100 of the present invention not only greatly raises the power efficiency of the system, but also reduces the manufacturing cost and area of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light emitting diode (LED) driving chip having eight pins, the LED driving chip comprising:
    a current regulating circuit, arranged to selectively output a first current, a second current, a third current and a fourth current to a first pin, a second pin, a third pin and a fourth pin of the LED driving chip, respectively;
    a current control circuit, coupled to the current regulating circuit and a fifth pin, the current control circuit arranged to receive an adjusting signal from the fifth pin to control the first current, the second current, the third current and the fourth current;
    a feedback voltage control circuit, arranged to output a feedback voltage to a sixth pin according to a first specific voltage and a setting voltage, wherein the first specific voltage is selected from the first voltage, the second voltage, the third voltage and the fourth voltage corresponding to the first, the second, the third and the fourth pins, respectively; and
    a protection circuit, arranged to determine whether a voltage difference between a second specific voltage and the first specific voltage is larger than a threshold value, wherein the second specific voltage is selected from the first voltage, the second voltage, the third voltage and the fourth voltage; and when the voltage difference is larger than the threshold value, the protection circuit controls the current regulating circuit to stop conducting current to a specific pin corresponding to the first specific voltage to make a voltage of the specific pin no longer the first specific voltage, and the feedback voltage control circuit stops utilizing the voltage of the specific pin to output the feedback voltage.

2. The LED driving chip of claim 1, wherein the first specific voltage is a lowest voltage selected from the first voltage, the second voltage, the third voltage and the fourth voltage.

3. The LED driving chip of claim 1, wherein the second specific voltage is a highest voltage selected from the first voltage, the second voltage, the third voltage and the fourth voltage.

4. The LED driving chip of claim 1, wherein the adjusting signal is an initialization signal, a fixed direct current (DC) voltage, an adjustable DC voltage, or a pulse width modulation (PWM) signal.

5. The LED driving chip of claim 1, wherein the first voltage, the second voltage, the third voltage and the fourth voltage are voltages at the first pin, the second pin, the third pin and the fourth pin, respectively.

6. The LED driving chip of claim 1, wherein the current control circuit comprises:
    a low pass filter (LPF), arranged to perform low pass filtering upon the adjusting signal to generate a filtered adjusting signal used to control the first current, the second current, the third current and the fourth current;
    a comparator, arranged to compare the filtered adjusting signal with a predetermined voltage, to generate an initialization signal to enable the LED driving chip; and
    a clamping circuit, arranged to clamp the filtered adjusting signal at an upper-bound voltage when the filtered adjusting signal exceeds the upper-bound voltage.

7. The LED driving chip of claim 6, wherein the current regulating circuit at least comprises:
    a resistor, having a first end coupled to a ground voltage;
    a transistor, having a first connecting end coupled to a second end of the resistor, a second connecting end arranged to output one of the first current, the second current, the third current and the fourth current, and a control end arranged to receive a control signal;
    a first differential amplifier, arranged to generate a detection voltage according to a voltage across the first end and the second end of the resistor; and
    a second differential amplifier, arranged to generate the control signal according to the detection voltage and the filtered adjusting signal, in order to control the transistor.

8. The LED driving chip of claim 1, wherein the feedback voltage control circuit comprises:
    a first buffer, arranged to selectively output the first voltage as a first buffered voltage according to a first control signal;
    a second buffer, arranged to selectively output the second voltage as a second buffered voltage according to a second control signal;
    a third buffer, arranged to selectively output the third voltage as a third buffered voltage according to a third control signal;
    a fourth buffer, arranged to selectively output the fourth voltage as a fourth buffered voltage according to a fourth control signal;
    a selection circuit, arranged to output a lowest voltage selected from the first buffered voltage, the second buffered voltage, the third buffered voltage and the fourth buffered voltage as the first specific voltage; and
    a differential buffer, arranged to generate the feedback voltage according a difference between the setting voltage and the first specific voltage;

wherein before the LED driving chip starts operating, the differential buffer utilizes an output pull-up resistor to pull up the feedback voltage at the sixth pin to a higher voltage.

9. The LED driving chip of claim 8, wherein the protection circuit comprises a maximum voltage selection circuit, and the maximum voltage selection circuit comprises:
   a fifth buffer, arranged to buffer the first voltage to generate a fifth buffered voltage;
   a sixth buffer, arranged to buffer the second voltage to generate a sixth buffered voltage;
   a seventh buffer, arranged to buffer the third voltage to generate a seventh buffered voltage;
   an eighth buffer, arranged to buffer the fourth voltage to generate an eighth buffered voltage;
   a first diode, having an anode and a cathode, the anode of the first diode arranged to receive the fifth buffered voltage;
   a second diode, having an anode and a cathode, the anode of the second diode arranged to receive the sixth buffered voltage;
   a third diode, having an anode and a cathode, the anode of the third diode arranged to receive the seventh buffered voltage; and
   a fourth diode, having an anode and a cathode, the anode of the fourth diode arranged to receive the eighth buffered voltage;
   wherein cathodes of the first diode, the second diode, the third diode and the fourth diode are coupled to a common end, and the common end is arranged to output the second specific voltage.

10. The LED driving chip of claim 9, wherein the protection circuit further comprises:
    a first differential amplifier, arranged to generate a first voltage difference between the second specific voltage and the first voltage;
    a second differential amplifier, arranged to generate a second voltage difference between the second specific voltage and the second voltage;
    a third differential amplifier, arranged to generate a third voltage difference between the second specific voltage and the third voltage;
    a fourth differential amplifier, arranged to generate a fourth voltage difference between the second specific voltage and the fourth voltage;
    a first comparator, arranged to compare the first voltage difference with the threshold value, wherein when the first voltage difference is larger than the threshold value, the first comparator controls the current regulating circuit to stop conducting the first current to the first pin, and the first comparator disables the first buffer and pulls up the first buffered voltage to a supply voltage, so as to stop the first voltage from being provided to the selection circuit;
    a second comparator, arranged to compare the second voltage difference with the threshold value, wherein when the second voltage difference is larger than the threshold value, the second comparator controls the current regulating circuit to stop conducting the second current to the second pin, and the second comparator disables the second buffer and pulls up the second buffered voltage to the supply voltage, so as to stop the second voltage from being provided to the selection circuit;
    a third comparator, arranged to compare the third voltage difference with the threshold value, wherein when the third voltage difference is larger than the threshold value, the third comparator controls the current regulating circuit to stop conducting the third current to the third pin, and the third comparator disables the third buffer and pulls up the third buffered voltage to the supply voltage, so as to stop the third voltage from being provided to the selection circuit; and
    a fourth comparator, arranged to compare the fourth voltage difference with the threshold value, wherein when the fourth voltage difference is larger than the threshold value, the fourth comparator controls the current regulating circuit to stop conducting the fourth current to the fourth pin, and the fourth comparator disables the fourth buffer and pulls up the fourth buffered voltage to the supply voltage, so as to stop the fourth voltage from being provided to the selection circuit.

11. The LED driving chip of claim 1, wherein a seventh pin of the LED driving chip is coupled to a supply voltage, and an eighth pin of the LED driving chip is coupled to a ground voltage.

12. A light emitting diode (LED) driving system, comprising:
    an LED driving chip, having eight pins, the LED driving chip comprising:
       a current regulating circuit, arranged to selectively output a first current, a second current, a third current and a fourth current to a first pin, a second pin, a third pin and a fourth pin of the LED driving chip, respectively;
       a current control circuit, coupled to the current regulating circuit and a fifth pin, the current control circuit arranged to receive an adjusting signal from the fifth pin to control the first current, the second current, the third current and the fourth current;
       a feedback voltage control circuit, arranged to output a feedback voltage to a sixth pin according to a first specific voltage and a setting voltage, wherein the first specific voltage is selected from the first, the second, the third and the fourth voltages respectively corresponding to the first, the second, the third and the fourth pins;
       a protection circuit, arranged to determine whether a voltage difference between a second specific voltage and the first specific voltage is larger than a threshold value, wherein the second specific voltage is selected from the first, the second, the third and the fourth voltages, and when the voltage difference is larger than the threshold value, the protection circuit controls the current regulating circuit to stop conducting current to a specific pin corresponding to the first specific voltage to make a voltage of the specific pin no longer the first specific voltage, and the feedback voltage control circuit stops utilizing the voltage of the specific pin to output the feedback voltage; and
    a power supply, having a feedback control end coupled to the sixth pin, the power supply arranged to generate a direct current (DC) power voltage at an output end according to the feedback voltage;
    at least one LED, coupled between the DC power voltage and at least one pin selected from the first pin, the second pin, the third pin and the fourth pin; and
    an adjusting circuit, coupled to the fifth pin, the adjusting circuit arranged to generate the adjusting signal according to a brightness control signal.

13. The LED driving system of claim 12, wherein the power supply comprises:

an alternating current to direct current (AC/DC) power supply, arranged to convert an alternating current (AC) power voltage into the DC power voltage according to a sensing signal; and a sensing circuit, coupled between the sixth pin and the AC/DC power supply, the sensing circuit arranged to generate the sensing signal according to the first specific voltage.

14. The LED driving system of claim 13, wherein the sensing circuit comprises:
a regulator, arranged to generate a regulated voltage signal according to the first specific voltage; and
a photoelectric coupler, arranged to generate the sensing signal according to the regulated voltage signal.

15. The LED driving system of claim 13, wherein the power supply further comprises:
a first resistor, having a first end coupled to the output end, and a second end coupled to the sixth pin;
a second resistor, having a first end coupled to the sixth pin, and a second end coupled to the sensing circuit; and
a third resistor, having a first end coupled to the sensing circuit, and a second end coupled to a ground voltage.

16. The LED driving system of claim 15, further comprising:
a standby protection circuit, coupled to the second end of the second resistor, the standby protection circuit arranged to reduce the DC power voltage at the output end according to a standby control signal.

17. The LED driving system of claim 16, wherein the standby protection circuit comprises:
a fourth resistor, having a first end coupled to the second end of the second resistor; and
a transistor switch, having a first connecting end coupled to a second end of the fourth resistor, a second connecting end coupled to the ground voltage, and a control end arranged to receive the standby control signal;
wherein when the LED driving system is in a standby mode, the standby control signal turns off the transistor switch to reduce the DC power voltage at the output end.

18. The LED driving system of claim 12, wherein the adjusting circuit comprises:

a first passive element, having a first end coupled to the fifth pin, and a second end coupled to a ground voltage; and
a second passive element, having a first end coupled to the fifth pin, and a second end arranged to receive the brightness control signal.

19. The LED driving system of claim 12, wherein the brightness control signal is an initialization signal, a fixed DC voltage, an adjustable DC voltage, or a pulse width modulation (PWM) signal.

20. The LED driving system of claim 12, wherein a seventh pin of the LED driving chip is coupled to a supply voltage, and an eighth pin of the LED driving chip is coupled to a ground voltage.

21. A light emitting diode (LED) driving chip having sixth pins, comprising:
a current regulating circuit, arranged to selectively output a first current and a second current to a first pin and a second pin, respectively;
a current control circuit, coupled to the current regulating circuit and a third pin, the current control circuit arranged to receive an adjusting signal from the third pin to control the first current and the second current;
a feedback voltage control circuit, arranged to output a feedback voltage to a fourth pin according to a first specific voltage and a setting voltage, wherein the first specific voltage is selected from a first voltage and a second voltage respectively corresponding to the first pin and the second pin; and
a protection circuit, arranged to determine whether a voltage difference between a second specific voltage and the first specific voltage is larger than a threshold value, wherein the second specific voltage is selected from the first voltage and the second voltage, and when the voltage difference is larger than the threshold value, the protection circuit controls the current regulating circuit to stop conducting current to a specific pin corresponding to the first specific voltage, so as to make a voltage of the specific pin no longer the first specific voltage.

22. The LED driving chip of claim 21, wherein a fifth pin is coupled to a supply voltage, and a sixth pin is coupled to a ground voltage.

* * * * *